(12) United States Patent
Sun et al.

(10) Patent No.: US 7,319,927 B1
(45) Date of Patent: Jan. 15, 2008

(54) CONSTANT SPEED CONTROL SYSTEM

(75) Inventors: Qiong Sun, Farmington Hills, MI (US); Eric Schieb, Duluth, GA (US); Arnold H. Spieker, Commerce Township, MI (US); David W. Weber, South Lyon, MI (US); Frank Lubischer, Novi, MI (US)

(73) Assignee: Kelsey-Hayes Company, Livonia, MI (US)

( * ) Notice: Subject to any disclaimer, the term of this patent is extended or adjusted under 35 U.S.C. 154(b) by 10 days.

(21) Appl. No.: 11/127,396

(22) Filed: May 12, 2005

(51) Int. Cl.
*G06F 17/00* (2006.01)
*B60K 31/00* (2006.01)

(52) U.S. Cl. .................. 701/93; 701/48; 701/54; 701/70; 701/75; 701/76; 701/79; 701/84; 701/96; 701/97; 303/191; 303/192; 180/170

(58) Field of Classification Search .............. 701/48, 701/54, 70–76, 79, 84, 93–98; 180/170; 303/191, 192
See application file for complete search history.

(56) References Cited

U.S. PATENT DOCUMENTS

| | | | |
|---|---|---|---|
| 4,921,065 A * | 5/1990 | Hamada et al. ............ 180/245 |
| 5,065,836 A * | 11/1991 | Hamada et al. ............ 180/245 |
| 5,224,045 A | 6/1993 | Stasell |
| 5,703,776 A | 12/1997 | Soung |
| 5,941,614 A | 8/1999 | Gallery et al. |
| 5,957,552 A | 9/1999 | Claussen et al. |
| 5,997,108 A | 12/1999 | Claussen et al. |
| 6,078,860 A | 6/2000 | Kerns |
| 6,122,588 A * | 9/2000 | Shehan et al. ............ 701/93 |
| 6,193,333 B1 | 2/2001 | Guest |
| 6,233,514 B1 | 5/2001 | Claussen et al. |
| 6,243,640 B1 | 6/2001 | Beever |
| 6,332,450 B1 | 12/2001 | Muto et al. |
| 6,349,253 B1 | 2/2002 | Bellinger |
| 6,434,466 B1 * | 8/2002 | Robichaux et al. .......... 701/54 |
| 6,527,076 B1 | 3/2003 | Polzin |
| 6,535,809 B1 * | 3/2003 | Beyer et al. ............. 701/84 |
| 6,609,994 B2 | 8/2003 | Muramoto |
| 6,654,677 B2 | 11/2003 | Weber et al. |
| 6,732,039 B2 * | 5/2004 | Ino et al. ................. 701/93 |
| 7,134,985 B2 * | 11/2006 | Watanabe et al. .......... 477/186 |
| 2001/0044691 A1 * | 11/2001 | Ishizu et al. ............. 701/93 |
| 2001/0049578 A1 * | 12/2001 | Tamura et al. ............. 701/96 |
| 2002/0107106 A1 * | 8/2002 | Kato et al. ............... 477/110 |

* cited by examiner

*Primary Examiner*—Jack Keith
*Assistant Examiner*—Chuong Nguyen
(74) *Attorney, Agent, or Firm*—MacMillan, Sobanski & Todd, LLC

(57) ABSTRACT

A method is provided for controlling a low speed operation of a vehicle. A speed activation switch is activated. A target vehicle speed is calculated in response to an accelerator pedal demand as determined by an accelerator pedal position where each respective accelerator pedal position is associated with a respective predetermined target vehicle speed. A vehicle turning geometry is determined in response to a steering wheel angle input. A target wheel speed of each of a plurality of vehicle wheels is calculated as a function of the target vehicle speed and turning geometry. An actual wheel speed of each wheel is measured. A net torque is determined in response to the target wheel speeds and actual wheel speeds. An engine output torque and a braking torque are determined in response to the net torque. The engine output torque and the total vehicle braking torque are controlled for cooperatively maintaining the target vehicle speed.

11 Claims, 4 Drawing Sheets

CONSTANT SPEED CONTROL SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to speed control systems, and more specifically, to speed control systems for controlling speed through the use of engine torque and brake torque control.

2. Description of the Related Art

A driver of a vehicle while traveling along various roads, inclinations, or reversing a vehicle attached to a trailer may find themselves managing multiple tasks in addition to manipulating the accelerator and brake pedals to maintain a desired speed. Such tasks arise because often road surfaces have obstacles (i.e., trees, narrowed pathways, boat launch) which require the driver to concentrate on avoiding them more than on applying a respective force to the acceleration pedal. But more times than not, too much acceleration force is applied and the driver must switch between the acceleration pedal and the brake pedal to maintain the desired speed, often resulting in surging and stopping of the vehicle. This multi-tasking may distract the driver from concentrating on the driving task (i.e., parallel parking, backing a trailer in stall/garage, or backing a boat trailer onto a boat launch dock) or adjusting to various road conditions surrounding the vehicle because the driver is concentrating on operating the accelerator and brake pedals to maintain a desired vehicle speed. Thus, it is desirable to provide some assistance to a vehicle driver, especially one towing a trailer, with maintaining a vehicle speed while the driver concentrates on the road or parking lot conditions.

Conventional cruise control systems try to maintain the preselected speed of a vehicle, whether on flat, ascending or descending grades. These conventional systems typically only work when the vehicle is traveling above a certain threshold speed, such as forty-five miles per hour. With such cruise control systems, as the vehicle transitions up an ascending grade, the throttle is increased to maintain the vehicle at the preselected speed. However, if the cruise control system is active while the vehicle is transitioning down an inclination, the actual vehicle speed may increase beyond that of the speed set by the cruise control. In response, the cruise control system will decrease the throttle in order to reduce the engine torque thereby attempting to reduce the speed of the vehicle. The conventional cruise control system has no other self-means of reducing the actual speed of the vehicle to attain the lower vehicle target speed other than to reduce the torque of the engine. If, even with the reduced engine torque, the descent of the vehicle results in an actual speed greater than the set cruise control speed, the vehicle continues traveling down the descent at the higher speed until either the road surface changes grades or the driver applies the vehicle brakes.

Other types of vehicle speed control systems utilize braking descent systems to maintain the desired vehicle speed while transitioning down an inclination. These systems set a target speed to the vehicle speed as controlled by the brake pedal or the accelerator pedal when the vehicle speed control system is activated. These types of systems may be employed in heavy trucks to help maintain a desired speed when traveling down a descending grade. Again, these are systems for controlling a vehicle traveling at a relatively high rate of speed. These hill descent control systems utilize a single predetermined speed threshold, and when activated, the system determines whether to apply braking or release braking depending on the whether the actual vehicle speed is above or below the predetermined threshold.

When traveling at a relatively low speed, especially when maneuvering with a trailer, even if modified to work at low speeds, it is not practical to set buttons on these cruise control systems to maintain a constant speed. Moreover, even at low vehicle speed, the driver cannot just move the accelerator pedal to a predetermined position to cause the vehicle to travel at a give rate of speed because the vehicle speed does not just depend upon the amount of engine torque but also on the incline of the road surface. Thus, the driver is still required to manipulate the accelerator and brake pedals while also concentrating on maneuvering the vehicle, and possibly a trailer, for avoiding obstacles when traveling at a low rate of speed.

SUMMARY OF THE INVENTION

The present invention has the advantage of maintaining a vehicle target speed where the vehicle target speed is determined from a predetermined speed versus accelerator pedal position curve in response to an acceleration pedal position regardless of the road surface incline or curvature. The vehicle target speed is preferably a relatively low speed, such as a low vehicle speed employed when maneuvering a vehicle to park it.

In one aspect of the present invention, a method is provided for controlling a low speed operation of a vehicle. A speed activation switch is activated. A target vehicle speed is calculated in response to an accelerator pedal demand as determined by an accelerator pedal position where each respective accelerator pedal position is associated with a respective predetermined target vehicle speed. A vehicle turning geometry is determined in response to a steering wheel angle input. A target wheel speed of each of a plurality of vehicle wheels is calculated as a function of the target vehicle speed and the turning geometry. An actual wheel speed of each wheel of the vehicle is measured. A net torque is determined in response to the target wheel speeds and the actual wheel speeds. An engine output torque and a braking torque are determined in response to the net torque for cooperatively maintaining the vehicle at the target vehicle speed. The engine output torque and the total vehicle braking torque are controlled for cooperatively maintaining the target vehicle speed.

DETAILED DESCRIPTION OF PREFERRED EMBODIMENTS

Figure 1:
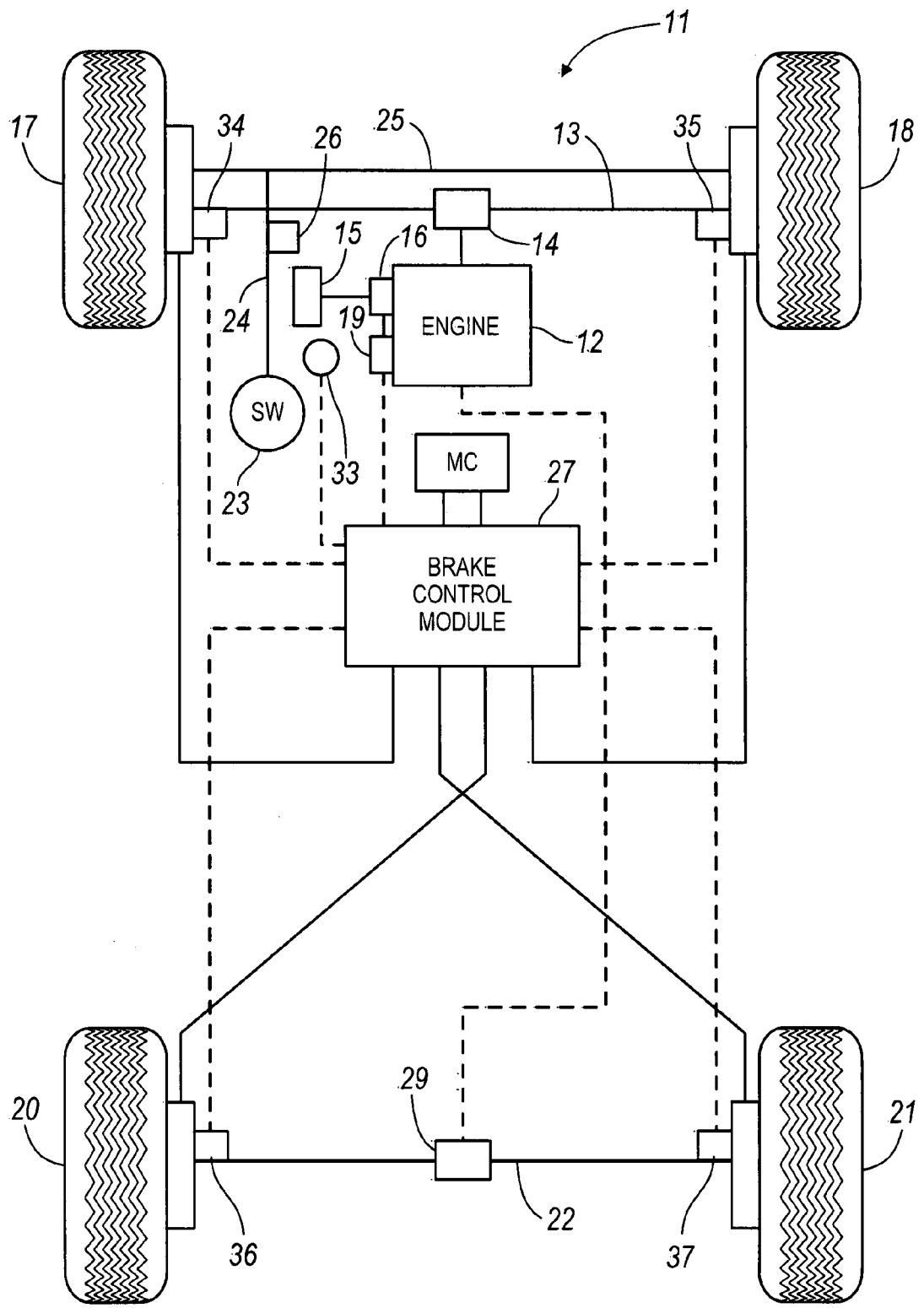
FIG. 1 illustrates an all wheel drive vehicle according to a preferred embodiment of the present invention.

FIG. 1 illustrates an all wheel drive vehicle 11 according to a preferred embodiment of the present invention. The vehicle 11 includes an engine 12 that is coupled to front axles 13 via a transaxle 14. An accelerator pedal 15 provides an acceleration pedal demand signal to a throttle 16 of the engine 12. The throttle 16 controls the amount of air flow to the engine 12 for outputting a desired engine torque for driving the front left wheel 17 and the front right wheel 18. A powertrain control module (PCM) 19 adjusts the operating conditions of the engine 12 based on the current vehicle operating conditions and environmental conditions for optimizing the engine output. The engine 12 outputs an engine torque that is transferred to front vehicle wheels 17 and 18 via the transaxle 14. The transaxle 14 preferably includes a conventional differential subsystem that distributes engine torque between the front left and front right wheels 17 and 18. This also allows both front wheels 17 and 18 to rotate at different speeds when the vehicle is turning to the right or left. A rear left vehicle wheel 20 and a rear right vehicle wheel 21 are coupled to a rear vehicle axle 22. The engine torque is transferred to the rear vehicle wheels 20 and 21 via a driveshaft and rear transaxle 29. The rear transaxle 29 also preferably includes a conventional differential subsystem that distributes engine torque between the rear left and front right wheels 20 and 21. In alternative embodiments, a front wheel drive or rear wheel drive vehicle may be utilized.

A steering wheel 23 is coupled to a steering column shaft 24 for transferring a steering command input by a driver to a steering linkage assembly 25 for steering the front vehicle wheels 17 and 18. A steering wheel sensing device 26 senses the angle $\theta_{SWA}$ of the steering wheel.

A brake control module 27 includes a plurality of valves (not shown) for applying pressurized hydraulic braking fluid to braking actuators (not shown) disposed on each vehicle wheel 17, 18, 20, 21. Additional valves (not shown) and control modules (not shown) may be utilized for further controlling the flow of pressurized hydraulic braking fluid to a respective vehicle wheel for providing secondary braking operations such as anti-lock braking, traction control, or vehicle stability control. The valves, hydraulic fluid flow paths and actuators for braking systems are well known to those skilled in the art and so will not be discussed in detail herein. Wheel speed sensors 34-37 are disposed at each wheel and may be used to sense the speed of each wheel for providing wheel speed information to the braking control module 27.

Figure 2:
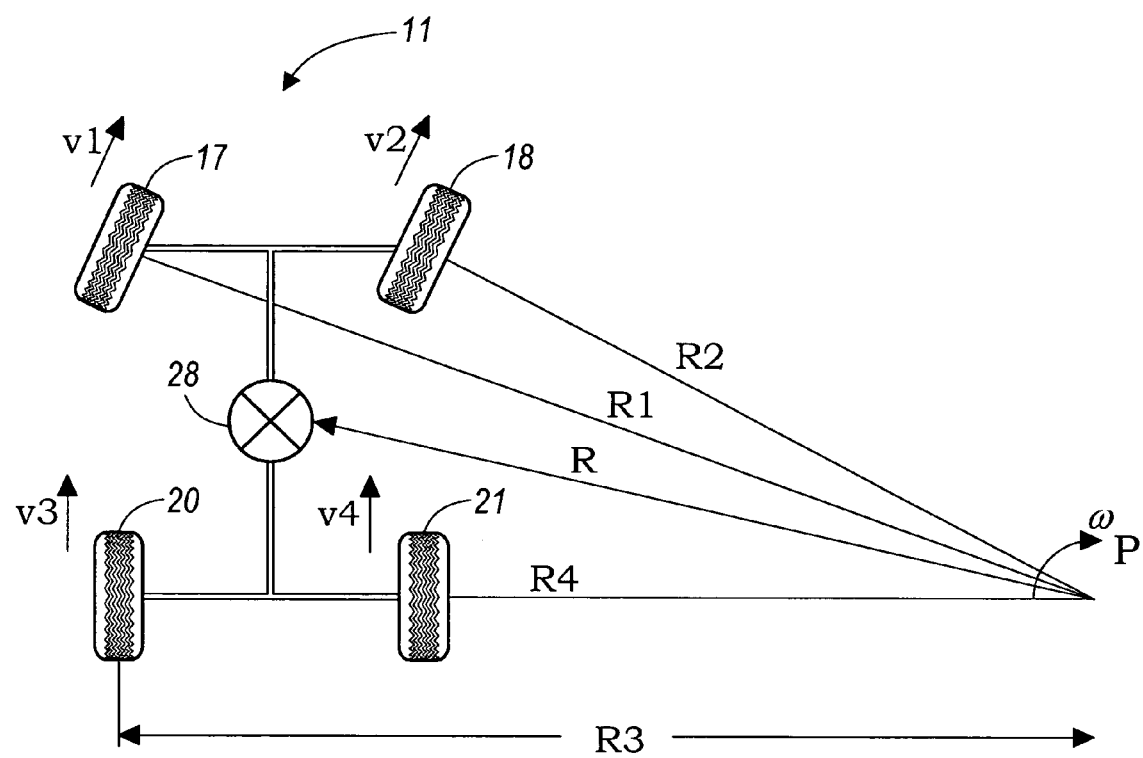
FIG. 2 illustrates a turning geometry of the all wheel drive vehicle according to a preferred embodiment of the present invention.

FIG. 2 is a diagram illustrating a turning geometry for vehicle 11 having steerable front vehicle wheels 17 and 18 and non-steerable rear wheels 20, 21. The front vehicle wheels 17 and 18 are pivoted at an angle corresponding to the steering wheel angle $\theta_{SWA}$ as input by a driver. A respective line $R_1$, $R_2$, $R_3$, $R_4$ is drawn from the center of each vehicle wheel 17, 18, 20, 21 for establishing a center turning point P. Since, in the example shown in the diagram illustrated of FIG. 2 the vehicle is turning to the right, the front left wheel 17 is also the front outside wheel, the front right wheel 18 is also the front inside wheel, the rear left wheel 20 is also the rear outside wheel, and the rear right wheel 21 is also the rear inside wheel. Of course, if the vehicle were turning to the left, then the inside and outside designations would be reversed. In order to establish the turning point P, Line $R_1$ is drawn perpendicular from the front outside wheel 17 in the direction of the turn, Line $R_2$ is drawn perpendicular from the front inside wheel 18 in the direction of the turn, and lines $R_3$ and $R_4$ are drawn perpendicular from the rear outside wheel 20 and rear inside wheel 21, respectively, in the direction of the turn. Since the rear outside wheel 20 and rear inside wheel 21 are axially aligned and non-steerable, lines $R_3$ and $R_4$ overlap one another. The intersection of lines $R_1$, $R_2$, $R_3$, and $R_4$ define the vehicle center turning point P for the respective steering wheel angle $\theta_{SWA}$. For any given steering wheel angle $\theta_{SWA}$, the vehicle turn radius R is defined by drawing a perpendicular line from a vehicle center midpoint 28 to the center turning point P corresponding to that particular steering wheel angle $\theta_{SWA}$. The vehicle center midpoint 28 is defined as the point located an equal distance between all four wheels 17, 18, 20, 21. To put it another way, the vehicle center midpoint 28 is the diagonal intersection of imaginary lines drawn between the front outside wheel 17 and rear inside wheel 21 and the front inside wheel 18 and rear outside wheel 20. The vehicle will turn about the center turning point P at a radius R.

A Constant Speed Control (CSC) system is activated by actuating an activation switch 33 shown in FIG. 1. When CSC system is active, the vehicle transmission will maintain a low operating gear (i.e., first gear, second gear, or reverse gear). The CSC system is used for maintaining a vehicle target velocity $v_T$ and the individual wheel speeds. The vehicle target velocity $v_T$ is based on a driver's accelerator pedal demand which is a function of the accelerator pedal position irregardless of the road surface incline or curvature. The CSC determines the vehicle target velocity $v_T$ as a function of the torque demand:

$$v_T = f\{\Theta\} \quad (1)$$

where $\Theta$ is preferably the accelerator pedal position as determined by an acceleration pedal sensor 16 (shown in FIG. 1). Unlike conventional acceleration control systems, the CSC system when activated associates a respective accelerator pedal position with a respective vehicle target speed. In the conventional acceleration systems as discussed earlier, a same vehicle speed may be attained by a plurality of accelerator positions at different surface inclines. The CSC system when activated associates a specific target speed with a specific accelerator pedal position regardless of the surface incline, road condition, or road curvature.

Figure 3:
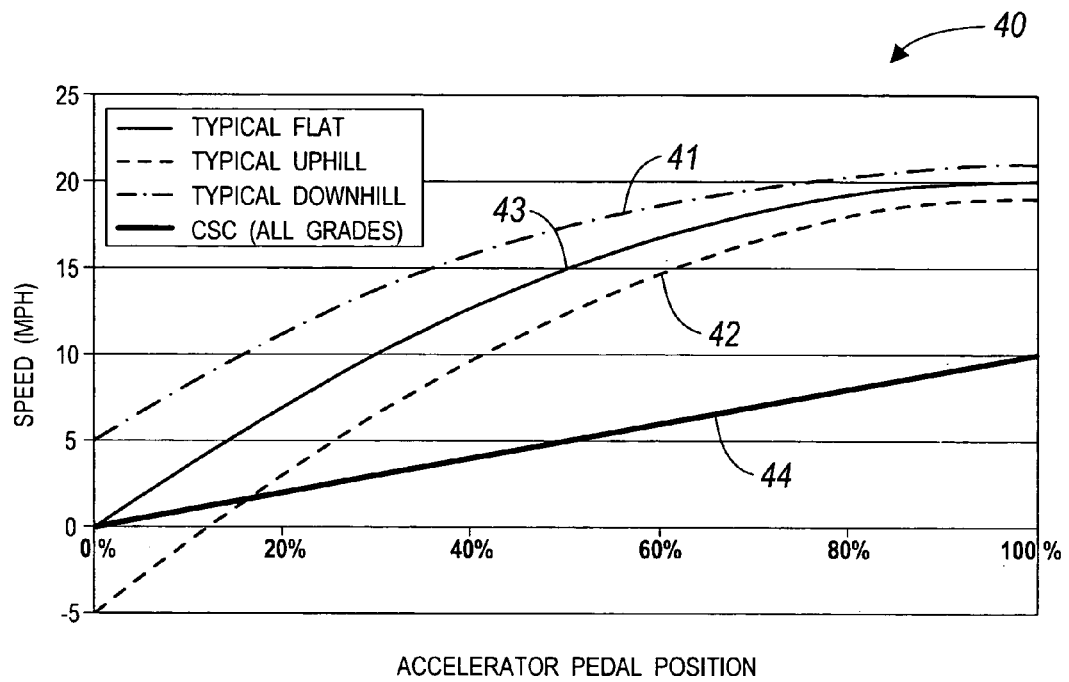
FIG. 3 is a graph correlating speed and accelerator pedal position for a vehicle according to a first preferred embodiment of the present invention.

FIG. 3 illustrates an example of a speed versus accelerator pedal position graph 40 according to a preferred embodiment of the present invention. The graph 40 is for a respective vehicle model. It should be noted that different vehicle models will have different speed versus accelerator pedal position graphs due to various vehicle characteristics (e.g., engine size, weight, etc.). An acceleration pedal position versus speed curve, is shown generally at 41, illustrating a typical downhill road grade for a low speed gear. The low speed gear may be a first, second, or a reverse gear. For a downhill decent, very little movement is required by the accelerator pedal position for generating a vehicle velocity. For the respective downhill descent as illustrated by the curve 41, a vehicle in low gear having no brake applied at 0% accelerator pedal position will begin a downhill descent without any an force input from the accelerator pedal.

In addition, an acceleration pedal position versus speed curve, is shown generally at 42, illustrating a typical uphill road grade for a low speed gear. For an uphill ascent, it is shown that about a 10% accelerator pedal position depression is required just to maintain the vehicle position at its current position on the uphill grade employed for this example. An accelerator pedal position depression of more than 10% is required to start the vehicle moving in the uphill direction. Gravitational force acting on the vehicle on the inclined surface is the cause of the increase pedal demand to begin movement of the vehicle. Given the respective downhill descent as illustrated by the curve 41, a vehicle having no brake applied at 0% accelerator pedal position will have a negative speed (i.e., begin downhill descent). In comparing downhill curve 41 and uphill curve 42, a 10% accelerator pedal position depression generates approximately an 8 mph vehicle speed as opposed to a 0 mph speed for curves 41 and 42, respectively, for the same accelerator pedal depression.

An acceleration pedal position versus speed curve for a flat road surface is shown generally at 43. The flat road surface curve 43 includes speed and accelerator pedal position properties midway between the downhill road surface curve 41 and the uphill road surface curve 43. At 0% accelerator pedal position, the vehicle has no forward or rearward forces exerted on the vehicle and as a result the vehicle speed is 0 mph. At 10% accelerator pedal position, the vehicle speed is approximately 4 mph. The various road curves 41, 42, 43 illustrate that for a respective accelerator pedal position, various vehicle speeds may be generated dependent upon the incline of the road surface. To alleviate the burden of the driver having to guess the amount that the accelerator pedal position must be depressed to generate and maintain a desired target speed for a given surface incline or non-incline, the system of the present invention employs a vehicle target speed curve, which is shown generally at 44, that is consistent between the respective accelerator pedal position and speed regardless of the surface incline. When the system is activated that employs the method described relative to FIG. 5, discussed below, once the accelerator pedal is depressed to a respective position, a vehicle target speed associated with accelerator pedal position is targeted regardless of the incline of the surface of the road. The CSC system then maintains the same speed regardless of any changes in a respective road grade (i.e., varying degree of same inclination) or transitioning between road grades (e.g., downhill to uphill). This allows the driver to concentrate on steering or maneuvering the vehicle along a desired path or about surrounding objects rather than concentrating attention on adjusting the accelerator and brake pedals.

Figure 5:
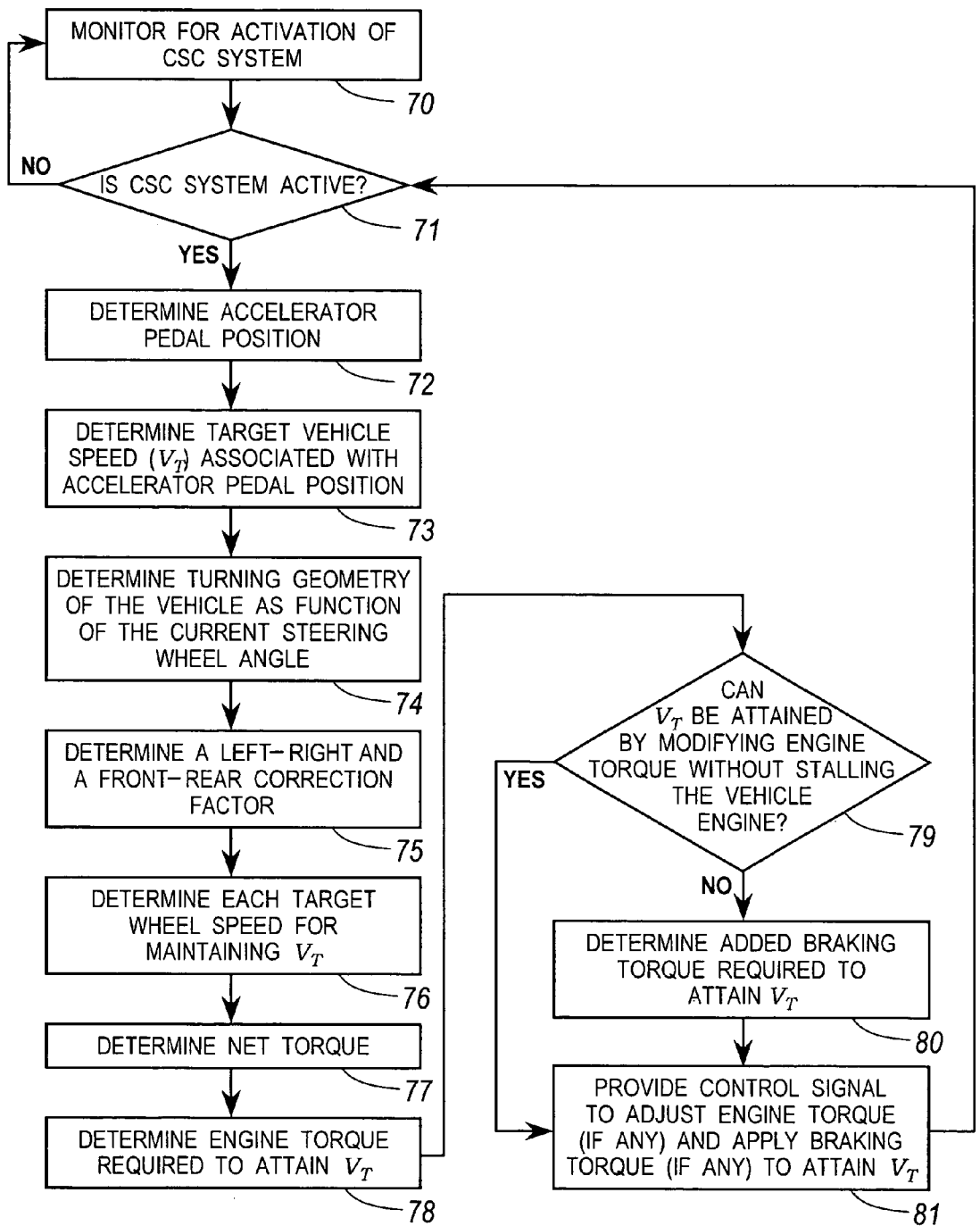
FIG. 5 is a method for maintaining a low speed as demanded by an accelerator pedal position according to a preferred embodiment of the present invention.

The following are the equations employed with the method described in FIG. 5 as they relate to a vehicle, such as that illustrated in FIG. 2. After the vehicle target velocity $v_T$ is determined, each individual wheel speed target is calculated as a function of the vehicle's turning geometry in relation to the vehicle target speed $v_T$ where:

$$v_{T1}, v_{T2}, v_{T3}, v_{T4} = f\{v_T, \text{turning geometry}\} \quad (2)$$

The vehicle target speed $v_T$ is assumed to be at the center of the rear axle. Once the vehicle target speed $v_T$ is determined, each vehicle wheel speed may be derived from the vehicle target speed $v_T$ using a correction factor. A left to right correction factor $\Delta_{l\_r}$ and a front to rear correction factor $\Delta_{f\_r}$ are based on a steady state turning geometry, steering wheel angle $\theta_{SWA}$, and the vehicle target speed $v_T$ and are used to differentiate the speeds of each wheel. The vehicle wheel speeds are calculated based on the following formulas:

$$v_{T1} = v_T + \frac{\Delta_{l\_r}}{2} + \Delta_{f\_r}, \quad (3)$$

$$v_{T2} = v_T - \frac{\Delta_{l\_r}}{2} + \Delta_{f\_r}, \quad (4)$$

$$v_{T3} = v_T + \frac{\Delta_{l\_r}}{2}, \quad (5)$$

$$v_{T4} = v_T - \frac{\Delta_{l\_r}}{2}, \quad (6)$$

Where $v_{T1}$ is a target wheel speed of a front outside tire; where $v_{T2}$ is a target wheel speed of a front inside tire; where $v_{T3}$ is a target wheel speed of a rear outside tire; where $v_{T4}$ is a target wheel speed of a front inside tire; where $v_T$ is a vehicle target speed; where $\Delta_{l\_r}$ is a wheel speed difference between an outside and inside wheel of a same axle; and where $\Delta_{f\_r}$ is a wheel speed difference between a front and rear wheel on a same vehicle side.

The vehicle target speed $v_T$ may be controlled by using two separate control devices either in combination or individually. First, vehicle speed may be controlled by reducing the output torque of the engine 12. The PCM 19 may control the engine for altering the engine output torque for controlling the vehicle speed. Secondly, the vehicle speed may be modulated by applying a braking force to each wheel as controlled by the braking control module 27 (shown in FIG. 1). However, most often vehicle target speed $v_T$ may be controlled by utilizing both the PCM 19 and the brake control module 27. A net torque $T_{net}$ is determined as the torque error difference for maintaining the constant vehicle speed between the two control devices. The actual average vehicle speed is determined using the data sensed from the wheel sensor 34-37 and is represented by the following formula:

$$(V_1 + V_2 + V_3 + V_4)/4 \quad (7)$$

where $V_1$, $V_2$, $V_3$, and $V_4$ are actual wheel speeds sensed by each wheel sensor.

The average target wheel speed is determined by the following formula:

$$(v_{T1} + v_{T2} + v_{T3} + v_{T4})/4 \quad (8)$$

Figure 4:
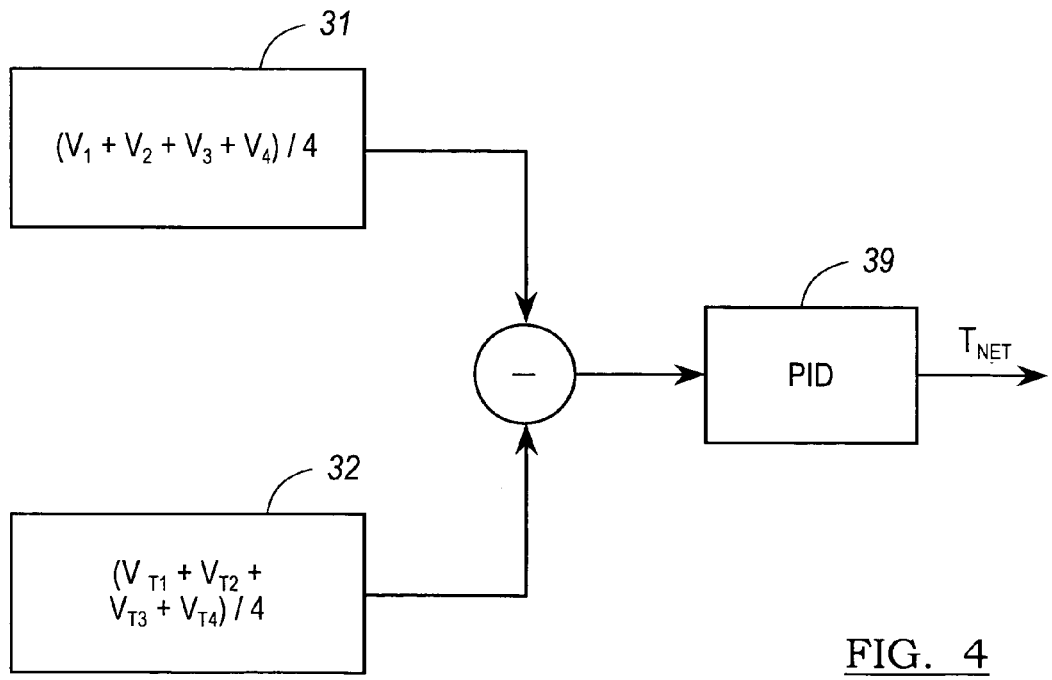
FIG. 4 is a block diagram of a control circuit for determining a net torque according to a first preferred embodiment of the present invention.

The resulting output determined by a PID controller 39, as shown in FIG. 4, is the difference of the average wheel speed 31 and the average target wheel speed 32. The resulting output is correlated to the torque error difference $T_{net}$ that requires adjustment by the braking force of the vehicle brakes. The torque error difference $T_{net}$ may be represented by the following formula:

$$T_{net} = T_{eng} - T_{brk\_CSC} \quad (9)$$

where $T_{eng}$ is the torque as applied by the engine and $T_{brk\_CSC}$ is the torque as applied by the vehicle brakes to make up the difference. The net torque $T_{net}$ is executed by modulating engine torque and brake torque independent of the accelerator and brake pedal. The brake control model 27 (FIG. 1) outputs a control signal to the PCM 19 to increase or decrease the engine torque as determined by the brake control module 27 in order to maintain the vehicle target speed $v_T$. If reducing the engine torque down to the desired level may cause the engine 12 to stall, then the vehicle target speed $v_T$ is achieved by also modulating the vehicle wheel brakes. The overall brake torque is then distributed evenly to each vehicle wheel 17, 18, 20, and 21 to maintain vehicle target speed $v_T$. Conversely, if a vehicle is ascending up an incline and the actual speed is less than the vehicle target speed $v_T$, the CSC system will provide a braking control signal to release each of the vehicle brakes (if applied) and provide a engine torque control signal to increase the engine torque to achieve the vehicle target speed $v_T$. If the vehicle is transitioning between uphill and downhill grades, the CSC system will continuously monitor the actual speed and provide respective control signals to decrease/increase the engine output torque and/or apply/release the vehicle brakes while the driver maintains the same accelerator pedal position for maintaining the target speed $v_T$ associated with the accelerator pedal position.

During the activation of a secondary vehicle control system such as anti-lock braking (ABS), yaw stability control (YSC), vehicle stability control (VSC), or traction control (TC) where a braking strategy is applied due to a condition between the road surface and the tires, such as on low mu surfaces, the secondary vehicle control system will have priority (i.e., control) over the CSC functionality. For example, during ABS activation, the CSC will allow the ABS system to maintain direct control over any wheel, however, any wheels not under the control of the ABS will remain under the control of the CSC system. Similarly, during the activation of traction control (TC) where too much engine torque is applied, the TC will have priority over the CSC system. The CSC system while active when a respective secondary vehicle control system is activated will seamlessly cooperate with the secondary vehicle control systems to allow the secondary vehicle control systems to control any of the respective wheels for stabilizing the vehicle and yet provide constant speed control for those wheels not under the control of the secondary vehicle control system.

FIG. 5 illustrates a method for controlling the low speed operation of a vehicle. In step 70, the CSC system is monitored to determine if active. In step 71, a determination is made whether the CSC system is active. The CSC system may only be activated when the transmission of the vehicle is in a low gear such as first or reverse. Preferably, the CSC will remain active if the vehicle speed is substantially at or below 34 mph, however, this maximum speed can be increased or decreased by a calibrating the CSC system, if desired. If a determination is made that the CSC system is not active, then a return is made to step 70 to monitor for activation of the CSC system. If the determination was made is step 72 that the CSC is active, then an accelerator pedal position is determined, preferably from an accelerator pedal position sensor. In step 73, a target vehicle speed is determined based on the position of the accelerator pedal position. A respective vehicle target speed $v_T$ is designated for each respective accelerator pedal position, such as that disclosed in the example illustrated in FIG. 3. In step 74, the vehicle turning geometry of a vehicle is determined based on the degree of rotation of the steering wheel. In step 75, a right-left correction factor and a front-rear correction factor is determined based on a vehicle target speed assumed at the center of the rear axle. In step 76, each target wheel speed is determined as a function of the vehicle target speed and the correction factors.

In step 77, a net torque is determined. An output difference is calculated as a result of the difference of the average actual wheel speeds and the average target wheel speeds. The output difference is input to a PID for determining the net torque. In step 78, a engine torque is determined for attaining the vehicle target speed $v_T$ by modifying the engine torque without stalling the engine. If vehicle target speed $v_T$ is greater than the actual speed that the vehicle is traveling, an increase in engine torque is required and engine stall is not a factor. If the vehicle target speed $v_T$ is less than the actual vehicle speed, the engine torque must be reduced and engine stall may be an issue.

In step 79, a determination is made whether the engine torque can be modified for attaining the vehicle target speed $v_T$ without stalling the engine. If a determination was made in step 79 that the vehicle target speed $v_T$ can be attained without stalling the engine, then a control signal is provided to the PCM to adjust the engine torque to attain the vehicle target speed $v_T$ in step 81. This is the result of either the engine torque being increased to attain a vehicle target speed $v_T$ that is greater than the actual vehicle speed or that the vehicle target speed $v_T$ is less than the actual vehicle speed but at a level where the engine torque may be reduced without stalling the vehicle engine. In both instances, no braking is required.

If the determination was made in step 79 that the engine torque cannot be modified to attain the vehicle target speed $v_T$ without stalling the vehicle engine, then the braking torque required to attain the vehicle target speed $v_T$ with the engine torque set to a minimum is determined in step 80. In step 81, a control signal is provided to the PCM to reduce the engine torque to a minimum without stalling the vehicle engine and the braking torque, as determined in step 80, is applied to the vehicle brakes to attain the vehicle target speed $v_T$. A return is then made to step 71 to determine if the CSC system is still active and to further monitor the accelerator pedal position.

From the foregoing description, one ordinarily skilled in the art can easily ascertain the essential characteristics of this invention and, without departing from the spirit and scope thereof, can make various changes and modifications to the invention to adapt it to various usages and conditions. Alternatively, the CSC system may be implemented on front wheel drive systems and rear wheel drive systems.

What is claimed is:

1. A method for controlling a low speed operation of a vehicle comprising the steps of:
   actuating a speed control activation switch;
   calculating a target vehicle speed in response to an accelerator pedal demand as determined by an accelerator pedal position where each respective accelerator pedal position is associated with a respective predetermined target vehicle speed;
   determining a vehicle turning geometry in response to a steering wheel angle input;
   calculating a target wheel speed of each of a plurality of vehicle wheels as a function of said target vehicle speed and said turning geometry;
   measuring an actual wheel speed of each wheel of said vehicle;
   determining a net torque in response to said target wheel speeds and said actual wheel speeds;
   determining an engine output torque and a braking torque in response to said net torque that will cooperatively maintain said vehicle at said target vehicle speed; and
   controlling said engine output torque and said braking torque such that said target vehicle speed is maintained.

2. The method of claim 1 wherein said step of calculating a target wheel speed for each of said wheels includes a front outside-target wheel speed $v^{T1}$, a front inside target wheel speed $v_{T2}$, a rear outside target wheel speed $v_{T3}$, and a rear inside target wheel speed $v_{T4}$, and $$v_{T1} = v_T + \frac{\Delta_{l\_r}}{2} + \Delta_{f\_r},$$

$$v_{T2} = v_T - \frac{\Delta_{l\_r}}{2} + \Delta_{f\_r},$$

$$v_{T3} = v_T + \frac{\Delta_{l\_r}}{2},$$

$$v_{T4} = v_T - \frac{\Delta_{l\_r}}{2},$$

where $v_T$ is a target vehicle speed, $\Delta_{l\_r}$ is a wheel speed difference between an outside and inside wheel of a same axle, and $\Delta_{f\_r}$ is a wheel speed difference between a front and a rear wheel on a same vehicle side.

3. The method of claim 1 wherein said step of determining said net torque includes determining a difference between an average of said actual wheel speeds and an average of said target wheel speeds.

4. The method of claim 3 wherein said difference is input to a PID controller for determining said net-torque.

5. The method of claim 4 wherein said PID controller is integrated within a brake control module.

6. The method of claim 4 wherein said step of determining an engine output torque and a braking torque includes the step of determining a magnitude of said engine output torque that will avoid stalling an engine of said vehicle without applying said braking torque while maintaining said target vehicle speed.

7. The method of claim 6 wherein a determination is made that if an actual vehicle speed is greater than said target vehicle speed after said engine torque is reduced to said magnitude without stalling an engine of said vehicle, then said braking torque is determined for reducing said actual vehicle speed to said vehicle target speed after said engine torque is reduced to said magnitude.

8. The method of claim 6 wherein said braking torque is distributed evenly to all of the plurality of said vehicle wheels.

9. A method for controlling a low speed operation of a vehicle comprising the steps of:
   actuating a speed control activation switch;
   sensing a steering wheel angle of a vehicle;
   sensing an acceleration pedal demand;
   measuring a wheel speed of each of a plurality of vehicle wheels;
   determining a vehicle turning geometry in response to a steering wheel angle input;
   calculating a target vehicle speed in response to an accelerator pedal demand determined by an accelerator pedal position where each respective accelerator pedal position is associated with a respective predetermined target vehicle speed;
   calculating a target wheel speed of each of a plurality of vehicle wheels as a function of said target vehicle speed and said turning geometry;
   determining a net torque in response to said target wheel speeds and said measured wheel speeds;
   determining an engine output torque and a braking torque in response to said net torque for cooperatively maintaining said vehicle at said target vehicle speed;
   transmitting an engine output torque control signal to a powertrain control module for changing said output torque for maintaining said vehicle target speed without stalling an engine of said vehicle; and
   selectively applying a braking torque to said plurality of vehicle wheels for cooperatively maintaining said target vehicle speed.

10. The method of claim 9 wherein said engine output torque control signal is transmitted from a brake control module to said powertrain control module and said brake control module controls an applied braking force to said plurality of vehicle wheels.

11. The method of claim 9 wherein said braking torque is applied only if said engine torque is at a minimum level without stalling said engine of said vehicle and if an actual speed of said vehicle is greater than a target vehicle speed.

* * * * *